US007874925B2

(12) United States Patent
Dewhirst

(10) Patent No.: US 7,874,925 B2
(45) Date of Patent: Jan. 25, 2011

(54) TRANSMISSION SHAFT JOINT DESIGN

(75) Inventor: Michael James Dewhirst, Northants (GB)

(73) Assignee: Crompton Technology Group Ltd., Banbury (GB)

(*) Notice: Subject to any disclaimer, the term of this patent is extended or adjusted under 35 U.S.C. 154(b) by 600 days.

(21) Appl. No.: 11/653,221

(22) Filed: Jan. 16, 2007

(65) Prior Publication Data
US 2008/0012329 A1 Jan. 17, 2008

(30) Foreign Application Priority Data
Jan. 17, 2006 (GB) ................... 0600874.2

(51) Int. Cl.
*F16D 1/072* (2006.01)
(52) U.S. Cl. ...................... 464/181; 464/182
(58) Field of Classification Search ........... 464/181, 464/182; 403/335–338, 359.1–359.6
See application file for complete search history.

(56) References Cited

U.S. PATENT DOCUMENTS

| 2,882,072 A | 4/1959 | Noland |
| 3,661,670 A | 5/1972 | Pierpont, Jr. |
| 4,041,599 A | 8/1977 | Smith |
| 4,089,190 A | 5/1978 | Worgan et al. |
| 4,171,626 A | 10/1979 | Yates et al. |
| 4,185,472 A | 1/1980 | Yates et al. |
| 4,187,135 A | 2/1980 | Yates et al. |
| 4,214,932 A | 7/1980 | Van Auken |
| 4,236,386 A | 12/1980 | Yates et al. |
| 4,238,539 A | 12/1980 | Yates et al. |
| 4,238,540 A | 12/1980 | Yates et al. |
| 4,259,382 A | 3/1981 | Schwan |
| 4,265,951 A | 5/1981 | Yates et al. |
| 5,601,493 A * | 2/1997 | Nakazono et al. ........... 464/181 |
| 6,863,763 B2 * | 3/2005 | Lee et al. ................ 464/181 X |
| 2003/0207715 A1 | 11/2003 | Sugiyama et al. |
| 2006/0258469 A1 | 11/2006 | Dewhirst et al. |

FOREIGN PATENT DOCUMENTS

| DE | 39 36 999 A1 | 5/1990 |
| GB | 1 356 393 | 6/1974 |
| GB | 2 026 651 A | 2/1980 |
| GB | 2 071 812 A | 9/1981 |
| GB | 2 207 732 A | 2/1989 |
| JP | 2001-65538 A | 3/2001 |

* cited by examiner

*Primary Examiner*—Greg Binda
(74) *Attorney, Agent, or Firm*—Crowell & Moring LLP

(57) ABSTRACT

A fiber reinforced composite shaft bearing a metallic flanged end coupling attached to the outside diameter through a concentric cylindrical torsional joint is provided. The composite shaft is press fitted into a flanged metallic end coupling including a multiplicity of teeth running parallel to the tube axis which cut longitudinal channels into the outside diameter of the composite shaft wall during the press fit process. Pairs of inverted troughs adjacent to and running parallel to the cutting teeth in the serrated region allow space for the redistribution of the composite material and debris formed during the press fitting process. This combined action forms a mechanical interface capable of supporting torsional and axial stresses. A structural adhesive may be applied to the joint region to form a secondary joint. In this case the composite formed between the cutting debris and the adhesive fills the trough channels.

3 Claims, 4 Drawing Sheets

TRANSMISSION SHAFT JOINT DESIGN

FIELD OF THE INVENTION

The invention relates to the design of a metallic end fitting which may be press fitted over the outside diameter at the end of a composite transmission shaft and through which loads can be transmitted to and from the shaft.

BACKGROUND OF THE INVENTION

A system consisting of a composite tube between two end fittings forms a lightweight transmission shaft which may be used to efficiently transmit static and dynamic torsional and longitudinal stresses in power transmission applications. Such systems are required to have good torsional, static and fatigue strength coupled with a high whirling resistance. To achieve the latter, low shaft densities, large diameters, reduced length and high longitudinal modulus are all advantageous characteristics. However, for any specific design application the lengths and diameters of the shafts are often fixed between narrow limits. A material combination with high specific axial modulus (high longitudinal modulus and low density) is required to produce a shaft with high resistance to whirling. To achieve this, composite tubes reinforced with high modulus fibres and in particular carbon fibre reinforced plastics (CFRP) are the materials of choice.

Fiber reinforced composite shafts exhibit advantages over metallic shafts, i.e., they are lighter in weight, more resistant to corrosion, stronger, and more inert. Fibre reinforced drive shafts comprising both glass fibers and carbon fibers in a resinous matrix have been disclosed by Union Carbide Inc in U.S. Pat. No. 4,089,190, issued in 1978.

Tubular fibre reinforced composites have been proposed, as demonstrated by Reinhold Engineering in U.S. Pat. No. 2,882,072 issued in 1959, by Koch Ind. Inc U.S. Pat. No. 3,661,670 issued in 1972, and by British Aircraft Corp. Ltd in GB1356393 issued in 1974. Vehicle drive shafts from tubular fibre reinforced composites, as demonstrated by Union Carbide in U.S. Pat. No. 4,041,599 issued in 1977, and by Celanese Corporation in U.S. Pat. No. 4,171,626 issued in 1979. Here the filaments bearing an uncured thermosetting resin are wound around a mandrel until the desired thickness has been established, whereupon the resinous material is cured. Zones or layers are positioned circumferentially within the wall of the shaft in the specific angular relationships there disclosed. The transmission of torque into the composite shaft through mechanical and adhesive joints is the subject of a series of further Celanese US patents granted in 1980-1981: U.S. Pat. Nos. 4,185,472, 4,187,135, 4,214,932, 4,236,386, 4,238,539, 4,238,540, 4,259,382 and 4,265,951. Mechanical fixing of a tubular composite shaft through an internally fitted tubular metallic splined interface is described in Mitsubishi Motors Corp. patent JP2001065538. GKN patent 2026651, 1979, claims an adhesively bonded torsion joint bonded to each ply layer through a stepped or conically machined composite wall to a matching end fitting. Loehr and Bromkamp patent GB2207732, 1989, claims a torsional joint formed by the frictional connection between a composite tube containing a wedge shaped layer with high helix angle and an internal cylindrical metallic spigot where the external spigot diameter is >0.2 mm greater then the internal diameter of the composite. Volkswagen patent DE3936999 issued in 1990, claims a joint made to the outside of a thickened shaft end and a knurled metallic end fitting. Daimler Benz patent GB2071812 issued in 1981, claims a connecting element with peripheral teeth pressed onto a fibre reinforced plastic tube in such a way that the connecting element effects a positively locked rotationally fast junction. Hitachi patent US2003/207715, 2003, uses a self aligning metallic spigot with external serrated teeth which pushes into the internal diameter of a composite tube containing an inner circumferential layer of reinforcement in the joint area.

US patent application US 2006/0258469, assigned to the present applicant and incorporated herein by reference, recites a design and method of producing a composite shaft with cylindrical end portions wherein all helical plies of fibre layers are exposed on the outer surface over which a metallic end coupling is attached through a push fit splined interface. The joint may be strengthened by internally reinforcing the main shaft with an interference fit tubular plug.

BRIEF SUMMARY OF THE INVENTION

The current invention is for the design of a metallic end fitting which is press fitted over the outside diameter at the end of a composite transmission shaft. The primary load transfer mechanism is made through an interference fit with the external surface of the composite tube and the metallic fitting which incorporates a serrated internal splined detail designed to accommodate the resulting composite debris generated during the fitting process.

Composite shafts can be manufactured in a variety of ways. The composite tube properties are tailorable through control of the relative thickness of the plies and angles relative to the axis of the shaft. Fibres wound at low angles <30° impart high axial tensile properties; fibres wound at 40-50° impart high torsional properties; fibres wound at 75-90° impart high hoop properties. Filament winding allows precise and reproducible combinations of winding helix angles, ply thicknesses and fibre type to be used in optimised lay ups. Very strong and efficient joints can be made by modifying the composite laminate in the end regions of the shaft such that the load is evenly distributed into all of the torque bearing plies of the tube. This is achieved by winding a wedge shaped inner layer of high angle hoop fibre which is used to control the local through thickness geometry of the outer helical plies such that upon cure and after a simple cylindrical surface machining of the end regions on the outer surface of the composite tube, the plies through the tube wall thickness are projected onto the surface of the tube. The primary load transfer mechanism is then made through an external interference fit with the modified surface of the composite tube and a metallic fitting which incorporates serrated splined internal features. This forms a mechanical interface with each helical ply layer thus avoiding premature joint failure through localized surface ply through-thickness delamination during torsional or axial loading. This process is described fully in CTG patent application US 2006/0258469.

Where opimised joint strengths are required the splined end fitting, which is the subject of the current invention, may be used in conjunction with the composite tubes described in US 2006/0258469. For less highly loaded shafts more traditional simple section filament wound shafts may be used in conjunction with the end fitting.

During the press fit process the spline teeth are designed to cut longitudinal channels into the outside diameter of the composite wall to form a mechanical interface with the composite tube. Inverted trough features adjacent to each cutting tooth allow for the redistribution of the composite section and for the containment of the debris material formed during the press fit process. A structural paste adhesive may be applied to the joint region during the press fit process. In this case the debris reinforces the adhesive around the splined interface to further enhance the joint stability. This optional secondary adhesive bond also acts as a sealant to encase all of the exposed fibres on the end face of the tube and serves to protect the exposed fibres from the environment. This design philosophy of not relying on a primary adhesive joint is very important in aerospace shafts where NDT methods are not able to reliably determine the integrity of a bonded joint.

The present invention accordingly provides methods and apparatus as defined in the appended claims.

BRIEF DESCRIPTION OF THE DRAWINGS

Certain embodiments of the invention will now be described with reference to the accompanying drawings, and are given by way of non-limiting examples only. In the appended drawings.

FIG. 2a shows a transverse section of the spline teeth and associated trough features in a flanged metallic end coupling having a complex serration design according to an embodiment of the present invention, while FIG. 2b shows an enlargement of the region 2b labeled in FIG. 2a;

DETAILED DESCRIPTION OF THE INVENTION

Figure 1:
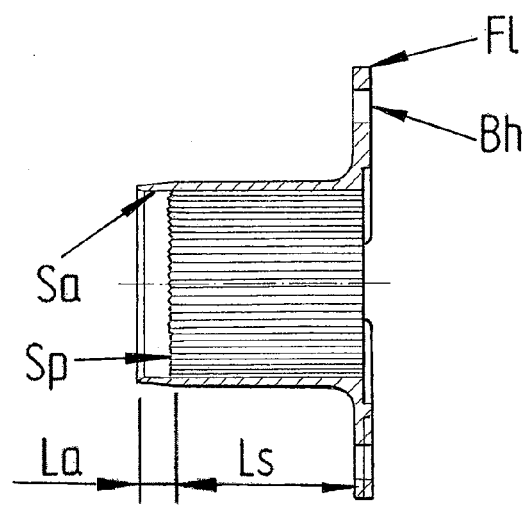
FIG. 1 shows the longitudinal section details of a general internally splined metallic end coupling.

FIG. 1 shows a longitudinal section of a general internally splined metallic end coupling. The fitting is machined out of a hard, stiff and strong alloy such as corrosion resisting S143 alloy steel. The fittings consist of an internal circumferential splined region (Sp) of length Ls, a cylindrical unsplined region (Sa) of length La having a flared internal tip diameter, a flange region (F1) containing a number of bolt holes (Bh), distributed evenly around a common pitch circle diameter, through which torque can be transmitted into and out of the shaft.

Figures 2A, 2B:
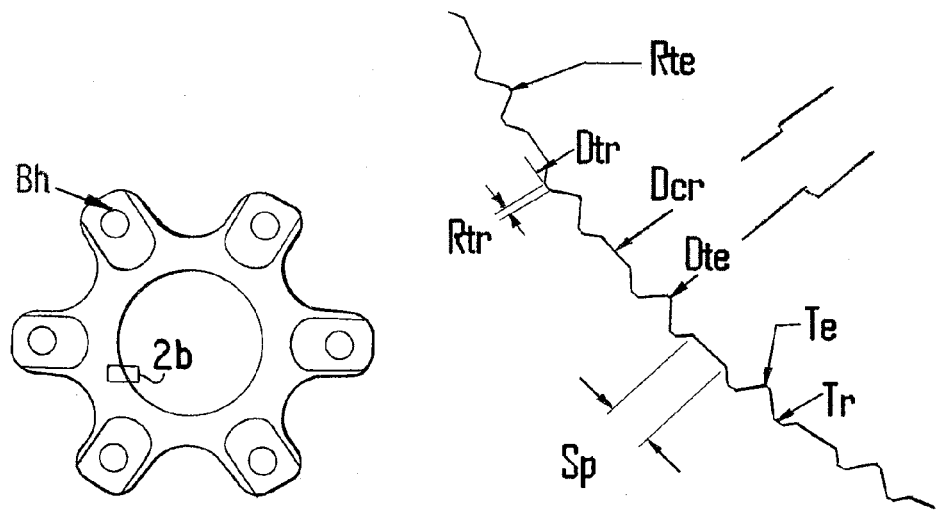

FIG. 2a shows a transverse section of an internally splined metallic end coupling of the present invention, showing a flange design with six boltholes (Bh); however, any number of holes may be used depending on the stresses to be transmitted and the dimensions of the composite shaft. The transverse spline profile defined as design 2 is shown more clearly in FIG. 2b, which is an enlargement of the part of FIG. 2a which is labeled 2b. The spline consists of a multiplicity of internally protruding teeth (Te) each having associated with them a pair of adjacent troughs (Tr). The teeth and troughs run parallel with the central axis of the end fitting and are arranged around a common crown diameter (Dcr). The cutting points of the teeth at the inner diameter (Dte) and the troughs at the outer diameter (Dtr) each include an angle around 90°. The teeth tips and trough hollows are radiused at Rte and Rtr respectively. Typically these radii are <0.1 mm. The crown arc length Sp is typically 0.5-1 mm. Combined together these features give low torsional stress concentrations in the metallic splined joint and allow for ease of manufacture whilst at the same time giving good broaching characteristics. Dcr is set to give a positive interference with the machined outside diameter of the composite shaft ends. Upon push fitting the shaft into the splined end fittings the points of the teeth mechanically lock into the surface of the composite tube.

Figure 3:
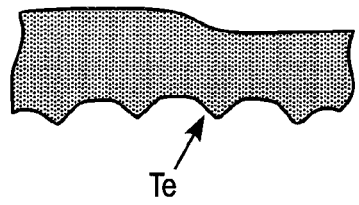
FIG. 3 shows details of a flanged metallic end coupling of the prior art, having a simple serration design.

For comparison a simple section spline, defined as design 1, is outlined in FIG. 3 which shows an enlargement akin to that of FIG. 2b. This does not form part of the present invention. This design has previously been presented in US 2006/0258469 and in this case when fitted to the composite shaft a mechanical interlock is formed at the tips of the teeth Te but there is no interference with the crown diameter.

Figure 4:
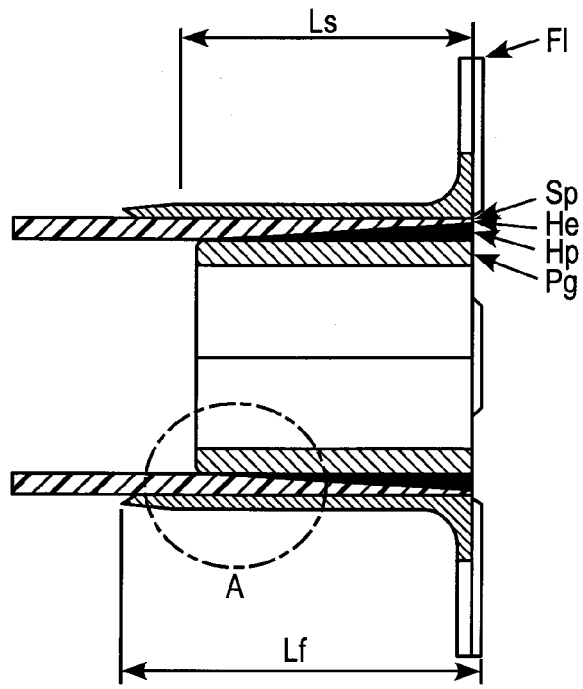
FIG. 4 shows a longitudinal section of the a general internally splined metallic end coupling push-fitted onto a composite transmission shaft.
Figure 4A:
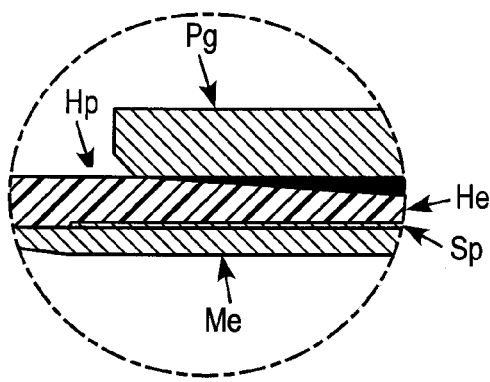
FIG. 4a is an enlarged detail of the encircled area shown in FIG. 4.

FIG. 4 shows one end of a composite shaft with an internally splined metallic end coupling Me of the present invention pushed into place over a composite shaft. The internally splined metallic end coupling Me has a total length Lf, of which a length Ls comprises internal splines Sp. The composite shaft is typically wound using a multiplicity of hoop (Hp) and helical (He) winding angles. As described in US 2006/0258469 an internal plug Pg may be used to reinforce the composite tube in the hoop direction. The plug Pg increases the hoop stiffness and strength of the end regions to prevent material in the main shaft wall buckling during the subsequent interference fitting of the metallic ends.

Figure 5:
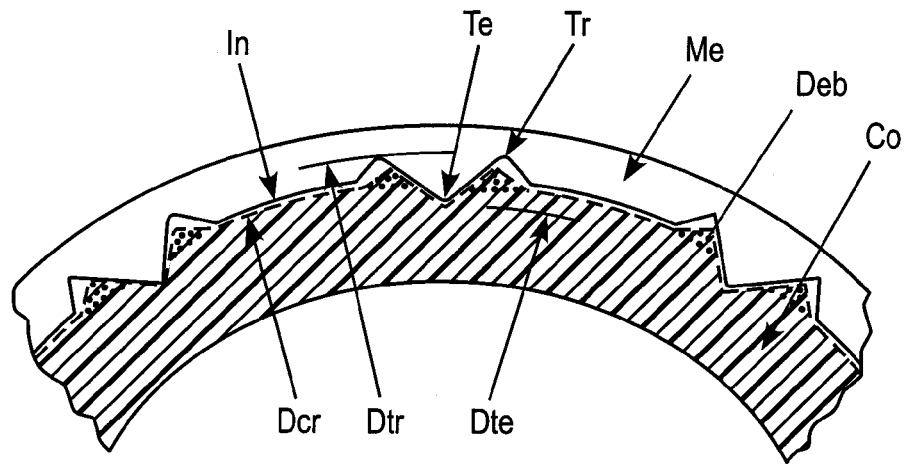
FIG. 5 shows a section of an internally splined metallic end coupling of the present invention mechanically locked in place on a composite shaft through a high interference fit with the serrations of the end fitting.

FIG. 5 shows a schematic of the assembled primary mechanical joint produced with internally splined metallic end coupling Me of the present invention (design 2). The spline teeth (Te) have an inner diameter (Dte) just less than the machined outer diameter of the composite shaft Co such that when the internally splined metallic end coupling Me of the present invention is axially compressed over the composite shaft Co, a matching spline is sculptured into the composite surface and an interference fit In with the crown diameter (Dcr) is formed over a length Ls (FIG. 4). The interference (In) of the internally splined metallic end coupling of the present invention is typically set at 0.15-0.2 mm with a cutting interference (Dcr-Dte) of typically 0.2-0.3 mm on composite shafts of diameters 22 to 28 mm. This end attachment process is inherently self-aligning giving highly concentric outer machined diameter of the main shaft ends and the flanged end fittings. The mechanically interlocked splined length (Ls), number of teeth and their geometry is chosen so that the mechanical interlock is able to support the required ultimate compressive and tensile loads as well as being able to transmit both design static and cyclic torque. The unsplined end region (Sa) defined by length La with a small radial clearance (FIG. 1) remains unbonded in the dry assembly process. When the internally splined metallic end coupling Me of the present invention is pressed over the outside of the composite shaft Co, it transmits compressive stresses into the shaft walls. Some cutting debris (Deb) is generated and this is accommodated in the trough regions Tr, which have a maximum diameter Dtr. The primary joint is then produced by a combination of the interference In at the crown diameter Dcr and cutting at the teeth tips Te.

Figure 6:
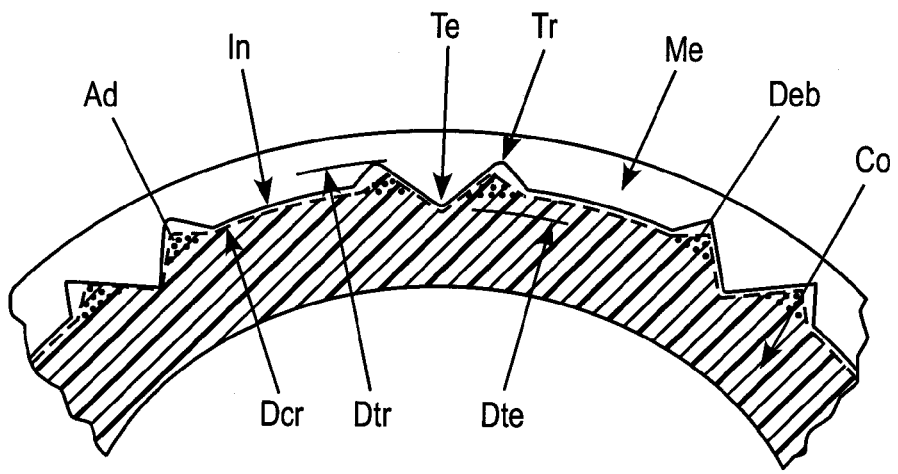
FIG. 6 shows a section similar to that of FIG. 5, with secondary adhesive applied.

FIG. 6 shows a transverse section through the shaft joint region which has been assembled as described with reference to FIG. 5, except that a high strength adhesive (Ad) is incorporated into the joint area between the composite shaft and the internally splined metallic end coupling of the present invention. The adhesive forms a structural joint over the cylindrical region of length La (FIG. 1) between the internally splined metallic end coupling of the present invention and the composite tube. The adhesive is also squeezed into the trough regions over the length Ls and forms a matrix around the composite debris Deb generated during the fitting operation. The adhesively bonded region acts as a secondary load path in the joint. This further increases the integrity of the joint region and also acts to seal the mechanical interface from the long-term effect of the working environment. The adhesive Ad is preferably applied to the outer surface of the composite shaft prior to assembly. Alternatively, the adhesive can also be introduced after dry assembly using a vacuum potting technique or an injection process. The adhesive, preferably of the epoxide family, can be subsequently cured either at ambient temperature of by the application of heat over appropriate times. The adhesive fills the gaps between the fittings and the machined surface of the composite which adds a radial constraint to the machined surface of the composite preventing the surface of the composite buckling or peeling away, and ensuring that the load path for torsional load is by shear of the composite Co in contact with the teeth of the spline. The ends of the adjacent joint region Sa are shaped to accommodate adhesive Ad fillets which act to reduce the stress concentrations at the ends of the adhesive joint. The relative length ratio Ls/La can be adjusted to alter the balance between the stresses carried by the mechanically fixed to adhesively bonded sections of the joint.

Figure 7:
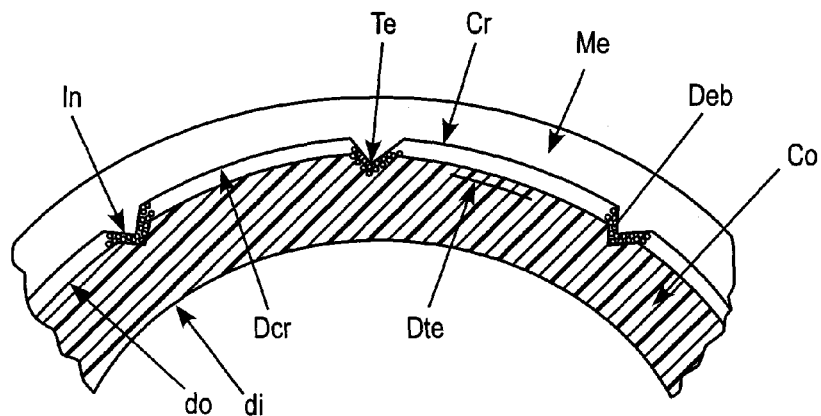
FIG. 7 shows a section of an internally splined metallic end coupling of the prior art mechanically locked in place on a composite shaft through an interference fit with the serrations of the end fitting.

FIG. 7 shows a transverse section through the shaft joint region which has been assembled using the prior art simple tooth profile of design 1. In this case, since the crown diameter (Dcr) is bigger than the outer diameter of the composite shaft, interference only occurs around the teeth tip diameter (Dte). A small amount of cutting debris (Deb) is generated.

Figure 8:
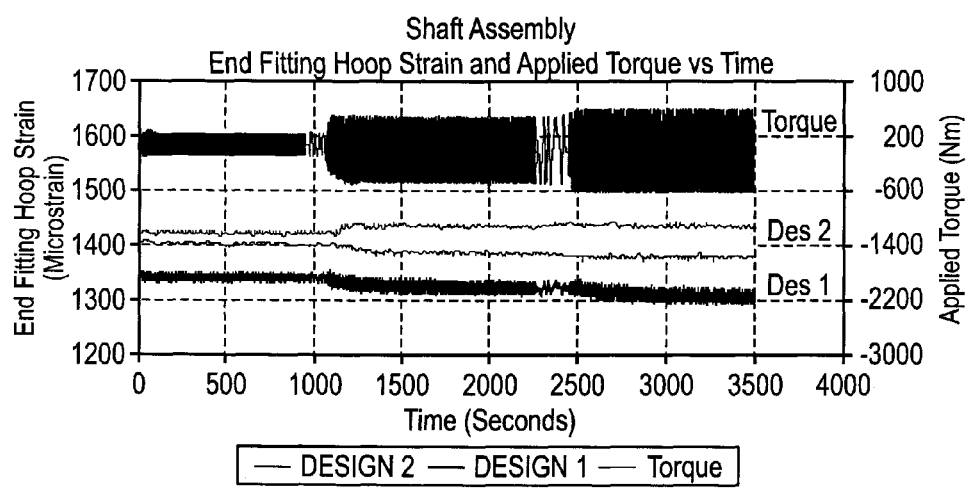
FIG. 8 shows test results illustrating the stability of the hoop strains transmitted at various torsional stresses, comparing results for an internally splined metallic end coupling of the present invention to results for an internally splined metallic end coupling of the prior art.

FIG. 8 shows experimental results, indicating the hoop strain transferred to the outer surface of the end fittings as a function of time for various cyclic torque amplitudes. Results for the internally splined metallic end coupling of the present invention (Des 2) is compared with a prior art splined metallic end coupling (Des 1) as illustrated in FIG. 7 which relies only on the cutting interaction at the tooth tips. The test results for Des 1 show a reduction in the stress transferred with time whereas the test results for Des 2 show the joint properties remain stable with time. The internally splined metallic end coupling of the present invention ensures that the prestress is maintained throughout load cycling and illustrates the creep resistance of the primary mechanical fit alone. The internally splined metallic end coupling of the present invention Des2 is proven to be superior to the internally splined metallic end coupling of the prior art Des1 under long term cyclic loading as the opportunities for fretting and mechanical degradation of the joint have been greatly reduced.

As first example of an embodiment of the invention the properties of a composite transmission shaft will now be illustrated based on sizes and ply orientations suitable for an aircraft wing flap lift shaft application.

Here 30,000 cycle fatigue torques of up to ±245 Nm and rotation speeds of 1300 rpm are a typical test requirement. The composite shaft Co has an outside diameter of 33 mm with an internal diameter of 27.7 mm and length of 1.75 m. Axial compressive loads in excess of 7 kN can be supported with less than 5 mm transverse deflection. To achieve this the central lay up of the main shaft is ±28° in a 2.45 mm thick layer overlying an inner layer of fibres wound at +89° in a 0.2 mm thick layer. Standard grade carbon fibre is used throughout. An epoxy bisphenol A resin with an anhydride curing agent would typically be used as the matrix resin. This is used to impregnate the fibre tows prior to laying down onto the mandrel. The longitudinal modulus of this construction is >50 GPa and the composite density is ~1560 $kgm^{-3}$.

The hoop stiffened end plugs Pg are wound using similar processes and materials to those used in the main tube. The tubular plugs are wound (±89° (0.75 mm) ±20° (0.35 mm))$_2$ to give a 21.3 mm as-moulded internal diameter with the outer diameter machined to 27.7 mm to give an light interference fit with the internal diameter of the main composite shaft Co. These tubes are push fit into the main shaft ends to a distance of 35 mm and the protruding ends of the plug are machined back to match the ends of the main shaft.

The metallic sleeve would typically be based on a 1.35 mm—thick, thin—walled, high-strength S143 steel with an internal diameter Dcr of 32.7 mm and length Lf 38 mm. The internal surface of the end fitting has 68 teeth with a spline length Ls of 31 mm and an inboard length La of 6 mm. During assembly, the two internally splined metallic end couplings Me of the present invention are simultaneously pushed onto opposite ends of the composite main shaft Co through the application of a compressive load of 35-50 kN. This creates a heavy interference In of 0.15 mm with the crown root diameter Dcr and in so doing cuts fine splined grooves into the external surface of the composite shaft Co. Testing of the serrated mechanical interface so produced without any secondary adhesive bonding has shown that the mechanical joint is able to support torsional loads of in excess of 1600 Nm and tensile loads in excess of 32 kN. The joint is stable in fatigue up to >10 million cycles over ±245 Nm.

A second embodiment of the invention consists of a similar primary joint as cited in the first example except that during the mechanical assembly process an epoxy adhesive Ad is incorporated into and spread around both the 31 mm long mechanical interface defined by Ls and the 6 mm long region defined by La, along which a 0.15 mm thick adhesive layer can be accommodated to protect the jointed area from the environment and optimise the bond performance. The incorporation of the secondary load path enabled enhanced torsional strengths in excess of 1700 Nm and higher tensile loads in excess of 35 kN to be supported. The adhesive also seals the ends and machined surfaces of the composite shaft in the joint region.

Although the invention has been described in connection with a preferred embodiment thereof, it will be appreciated by those skilled in the art that additions, modifications, substitutions and deletions not specifically described may be made without departing from the scope of the invention as defined in the appended claims. As such this invention is not restricted to the details of the foregoing example, but extends to the full scope of the appended claims.

The invention claimed is:

1. An assembly comprising:
a metallic end coupling; and
a polymeric fibre reinforced composite tubular shaft, wherein
the coupling has an inner cylindrical crown surface with an internal crown surface diameter such that the crown surface has an interference with an outer surface of a cylindrical end portion of the shaft,
the coupling is press fit over the outer surface of the cylindrical end portion of the shaft,
the coupling has a multiplicity of splines and troughs circumferentially spaced apart by lands of the crown surface and forming longitudinal cutting teeth each associated with a pair of adjacent troughs and extending axially of the crown surface with respective pairs of troughs being parallel to each side of a respective cutting tooth and having an external diameter greater than the crown surface diameter, and
the teeth have cut longitudinal channels into the outer surface of the shaft during the press fit with the troughs accommodating reshaping of the outer surface by said teeth and containing cutting debris formed by the teeth during said press fit with the lands exerting a compressive load on the outer surface of the end portion of the shaft.

2. An assembly according to claim 1, further comprising an adhesive bond between the outer surface of the cylindrical end portion of the shaft and the end coupling.

3. An assembly according to claim 2, wherein the adhesive bond forms:
   a) a matrix to bind the cutting debris and contain the reshaped composite shaft in the troughs;
   b) a secondary load path for reacting applied stresses; and
   c) a sealant to encase exposed fibers in the composite shaft.

* * * * *